Aug. 30, 1955 M. NAZZEWSKI Re. 24,057

GLOW LAMP

Original Filed Feb. 11, 1953

INVENTOR.
MATHEW NAZZEWSKI
BY
Connolly and Hutz
HIS ATTORNEYS

United States Patent Office

Re. 24,057
Reissued Aug. 30, 1955

24,057

GLOW LAMP

Mathew Nazzewski, Adams, Mass., assignor to Sprague Electric Company, North Adams, Mass., a corporation of Massachusetts Original No. 2,695,970, dated November 30, 1954, Serial No. 336,278, February 11, 1953. Application for reissue February 10, 1955, Serial No. 487,481

3 Claims. (Cl. 313—117)

Matter enclosed in heavy brackets [ ] appears in the original patent but forms no part of this reissue specification; matter printed in italics indicates the additions made by reissue.

The present invention relates to a new and improved type of glow lamp.

A great many styles, size and shapes have been suggested for glow or aeo lamps primarily used in recording sound upon a continuously moving strip of film. Light, to be used for this purpose must be directed upon the film in the form of extremely narrow, relatively short slits of uniform intensity throughout. Rather complicated lens systems have, in the past, been required to produce such light beams. Such systems, in addition to being expensive, suffer from inherent optical disadvantages. The prior art lamps used with such systems are, as a rule, characterized by less "response" to voltage changes than are desired.

Figure 1:
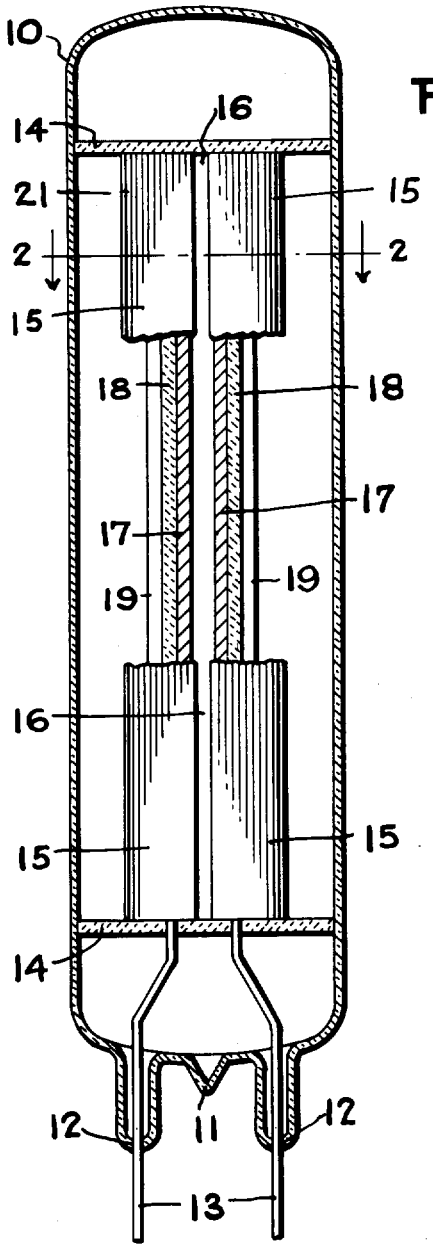
Figure 2:
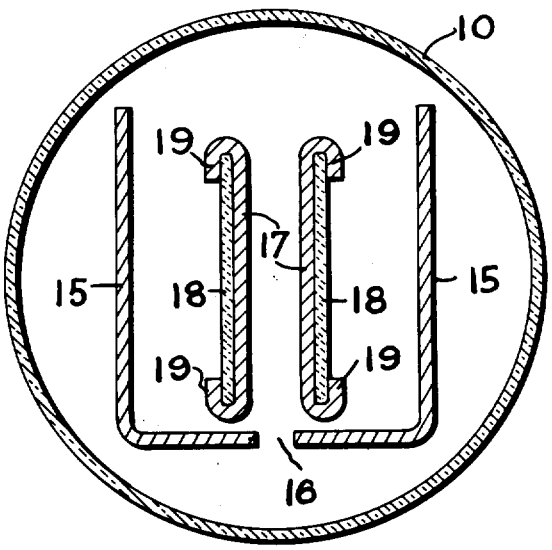

It is an object of the present invention to provide a glow or aeo lamps which can be used in sound recording without an extremely complex lens system. A further object is to produce a lamp of the indicated category which can be easily and cheaply manufactured, and which produces a slit of light of uniform intensity, and which is extremely sensitive to voltage changes. These and other objects of the invention, as well as the advantages of it, will be apparent from this description and claims, as the accompanying drawing, in which:

Figure 1 is a partially sectional front view of a glow lamp in accordance with the invention; and Figure 2 is a sectional view of the lamp of Figure 1 taken at line 2—2 of Figure 1.

Briefly, the glow lamp of the invention consists of two parallel flat sheet-like electrodes spaced close to one another and a slit-like shield positioned from said electrodes so as to restrict the light emitted from the area between them, the entire assembly being disposed in a sealed glass tube containing an ionizable gas such as neon, argon, or the like.

The invention will be best understood with reference to the accompanying drawings, especially Figure 1. Here it is seen that the preferred lamp of the invention consists of a glass envelope 10 sealed at 11 so as to contain an ionizable gas 21. The preferred gas for use with the invention is argon, although other equivalent gas known to the art may be used with satisfactory results. The gas 21 is retained within the envelope 10 under pressure. In general, the higher the pressure the more sensitive the voltage response of the lamp. For optimum results based upon practical and theoretical considerations it is presently considered that the pressure should be between about 2 and about 4 [atmospheres] *millimeters.*

The actual light emission results from the application or voltage between two flat parallel electrodes 17. Each of these electrodes is placed upon an insulating sheet 18 of mica or the like, and is held in position by bent-over portions 19. By virtue of this construction the electrodes 17 are free to expand in a crosswise direction when heated without bulking. The bent-over portions 19 preferably extend for the length of the electrodes 17, and are positioned loosely within notches in the support members 18 so as to be able to expand lengthwise. These electrodes 17 are attached as by soldering to leads 13 sealed within the envelopes 10 at 12.

The light emitted between the electrodes 17 is restricted in area to a large extent by the spacing of these elements. In general, the distance between these electrodes 17 is from 1/32 to 1/4 inch, although this is not critical. This light is also restricted by two L-shaped members 15 positioned so as to define a slit 16 extending substantially the length of the electrodes 17 and facing the space between these electrodes so that light emitted from this area will pass through it. The L members 15 are preferably formed of a dark metal so as to cut down the chances of the reflection of unwanted radiation.

Both the L members 15 and the electrodes 17 can be positioned with respect to one another by known means. One highly satisfactory method comprises attaching these elements to inert mica disks 14 by notching, these disks fitting closely within the walls of the envelope. In the particular construction shown the wire leads 13 aid in holding the assembled members 14, 15, 17 and 18 in place.

Obviously, the glow lamp shown can be varied widely in construction. Instead of using separate shielding members 15 to define a slit a unitary construction can be used for the same purpose, or the inside walls of the glass envelope can be coated so as to define a slit facing the electrodes. Reflective coatings or separate reflectors can be placed opposed from the slit used so as to concentrate light upon this slit, although such elements are not as a rule to be considered necessary or desirable because they frequently tend to produce a slightly divergent emitted light beam.

The actual voltage used to generate this light, the amount with which the emitted beam is concentrated by a lens system which need only consist of a single lens, as well as other factors affecting the construction and operation of the new glow lamp are items which are best determined depending upon the specific application involved. Those skilled in the art will have a minimum of difficulty with such determinations. For optimum results the slit employed should be placed in close proximity with the electrodes, and the width of the electrodes should be at least ten times the width of the slit. Further, this slit should be at most 3/4 as wide as the distance between the electrodes for optimum results.

As many apparently widely different embodiments of this invention may be made without departing from the spirit and scope hereof, it is to be understood that the invention is not limited to the specific embodiments hereof except as defined in the appended claims.

What is claimed is:

1. A glow lamp comprising a sealed glass envelope, an ionizable gas contained within said envelope, insulating disk positioned within and at opposed ends of said envelope, two inert metal L-shaped members supported by said disk within said envelope, two parallel rectangular plate electrodes partially disposed between said L-shaped members and supported by said disk, said insulating disk positioned perpendicular to the axial planes of said electrodes and said member, said L-shaped members defining a focusing slit positioned parallel to said electrodes in such a manner that a plane parallel to said electrodes and disposed therebetween will pass through said slit and wire leads extending from said electrodes through said glass envelope.

2. A glow lamp comprising two parallel rectangular plate electrodes, two inert metal L-shaped members disposed about said electrodes, said members defining a slit uniplanar with the volume defined by and disposed between said parallel electrodes, two electrically non-conducting supporting disks positioned at the opposed ends of said electrodes and said members, a sealed glass envelope disposed about said electrode, said members and said disks, an ionizable gas contained within said envelope and wire leads extending from said electrodes through said envelope.

3. A glow lamp comprising two parallel rectangular plate electrodes, a sealed glass envelope disposed about said electrodes, electrically non-conducting supports for said electrodes within said envelope, an ionizable gas contained within said envelope, wire leads extending from said electrodes through said envelope, and opaque means within said envelope constructed and arranged to substantially encompass said electrodes but defining a slit uniplanar with the volume defined by and disposed between said parallel electrodes.

References Cited in the file of this patent or the original patent

UNITED STATES PATENTS

| | | |
|---|---|---|
| 1,850,467 | Nakken | Mar. 22, 1932 |
| 1,864,547 | Morton et al. | June 28, 1932 |
| 1,879,472 | Pirani | Sept. 27, 1932 |
| 2,111,231 | Von Arndenne | Mar. 15, 1938 |